US008209045B2

(12) United States Patent
Morningred et al.

(10) Patent No.: US 8,209,045 B2
(45) Date of Patent: Jun. 26, 2012

(54) SYSTEM AND METHOD FOR DISCRETE SUPPLY CHAIN CONTROL AND OPTIMIZATION USING MODEL PREDICTIVE CONTROL

(75) Inventors: John Duane Morningred, Moorpark, CA (US); Joseph Lu, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 905 days.

(21) Appl. No.: 12/098,902

(22) Filed: Apr. 7, 2008

(65) Prior Publication Data
US 2009/0319070 A1 Dec. 24, 2009

(51) Int. Cl.
*G06F 19/00* (2011.01)
(52) U.S. Cl. .......................................... 700/103; 700/29
(58) Field of Classification Search .................... 700/29, 700/103
See application file for complete search history.

(56) References Cited

U.S. PATENT DOCUMENTS

| | | | |
|---|---|---|---|
| 5,351,184 A | 9/1994 | Lu et al. | |
| 5,561,599 A | 10/1996 | Lu | |
| 5,572,420 A | 11/1996 | Lu | |
| 5,574,638 A | 11/1996 | Lu | |
| 5,758,047 A | 5/1998 | Lu et al. | |
| 6,055,483 A | 4/2000 | Lu | |
| 6,122,555 A * | 9/2000 | Lu | 700/9 |
| 6,253,113 B1 | 6/2001 | Lu | |
| 6,347,254 B1 | 2/2002 | Lu | |
| 6,373,033 B1 * | 4/2002 | de Waard et al. | 219/497 |
| 6,381,505 B1 * | 4/2002 | Kassmann et al. | 700/44 |
| 6,542,782 B1 | 4/2003 | Lu | |
| 6,725,208 B1 * | 4/2004 | Hartman et al. | 706/23 |
| 6,922,593 B2 * | 7/2005 | Weiss | 700/30 |
| 7,016,742 B2 * | 3/2006 | Jarrell et al. | 700/28 |
| 7,054,706 B2 * | 5/2006 | Kempf et al. | 700/121 |
| 7,156,116 B2 | 1/2007 | Lu | |
| 7,188,637 B2 * | 3/2007 | Dreyer et al. | 137/6 |
| 7,194,317 B2 * | 3/2007 | Kothare et al. | 700/29 |
| 7,349,753 B2 * | 3/2008 | Paik | 700/110 |
| 7,644,863 B2 * | 1/2010 | Chen et al. | 235/385 |
| 7,768,672 B2 * | 8/2010 | Gil et al. | 358/1.9 |
| 8,036,758 B2 * | 10/2011 | Lu et al. | 700/29 |
| 2001/0021900 A1 * | 9/2001 | Kassmann | 703/2 |
| 2003/0046130 A1 * | 3/2003 | Golightly et al. | 705/7 |
| 2003/0126103 A1 * | 7/2003 | Chen et al. | 706/50 |

(Continued)

FOREIGN PATENT DOCUMENTS

JP 2002-007671 A 1/2002

(Continued)

OTHER PUBLICATIONS

"Stochastic process", Wikipedia, Mar. 25, 2008, 5 pages.

(Continued)

*Primary Examiner* — Albert Decady
*Assistant Examiner* — Anthony Whittington

(57) ABSTRACT

A system includes a first controller configured to monitor processes associated with a process facility and to generate control data for optimizing the process facility. The system also includes a second controller configured to use stochastic calculus of variations calculations to modify at least a portion of the control data. The second controller is configured to provide discrete supply chain control and optimization for the process facility and to track at least one of demand requirements and shipping requirements for product manufactured by a discrete supply chain manufacturing process. The system further includes third controllers configured to operate in accordance with the control data to control the processes and to optimize the process facility.

24 Claims, 8 Drawing Sheets

U.S. PATENT DOCUMENTS

| | | | |
|---|---|---|---|
| 2003/0158611 A1* | 8/2003 | Weiss | 700/31 |
| 2003/0220828 A1* | 11/2003 | Hwang et al. | 705/8 |
| 2004/0064202 A1* | 4/2004 | Kothare et al. | 700/39 |
| 2004/0093107 A1* | 5/2004 | Good et al. | 700/108 |
| 2004/0185786 A1* | 9/2004 | Mirbaha et al. | 455/67.11 |
| 2004/0199275 A1* | 10/2004 | Berckmans et al. | 700/90 |
| 2004/0267394 A1* | 12/2004 | Kempf et al. | 700/99 |
| 2006/0172705 A1* | 8/2006 | Parthasarathy et al. | 455/67.11 |
| 2006/0235557 A1* | 10/2006 | Knight et al. | 700/103 |
| 2006/0241986 A1* | 10/2006 | Harper | 705/7 |
| 2007/0142975 A1* | 6/2007 | Piche | 700/286 |
| 2008/0071395 A1* | 3/2008 | Pachner | 700/34 |
| 2008/0125881 A1* | 5/2008 | Grott et al. | 700/31 |
| 2009/0132064 A1* | 5/2009 | Ydstie | 700/42 |

FOREIGN PATENT DOCUMENTS

KR    20060020302 A    3/2006

OTHER PUBLICATIONS

"Malliavin calculus", Wikipedia, Mar. 7, 2008, 8 pages.
"Martingale (probability theory)", Wikipedia, Mar. 7, 2008, 7 pages.
Joseph Z. Lu, "Challenging control problems and emerging technologies in enterprise optimization", Control Engineering Practice 11 (2003), pp. 847-858.
S. Bose et al., "A model predictive framework for planning and scheduling problems: a case study of consumer goods supply chain", Computers and Chemical Engineering 24 (2000), pp. 329-335.
Partners in Innovation, presentation "Enabling Real-Time Agility in Discrete MES with Profit Controller and Profit Optimizer", 2004 Users Group Americas Symposium, 24 pages.
Kirk Smith et al., presentation, "Enabling Real-time Agility in Discrete Manufacturing Execution Systems with Profit Controller and Profit Optimizer", National Manufacturing Week 2005, 41 pages.

* cited by examiner

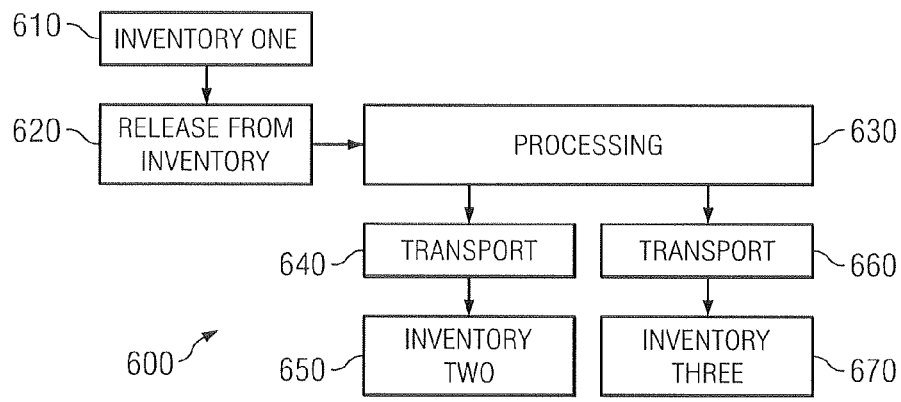
FIG. 6
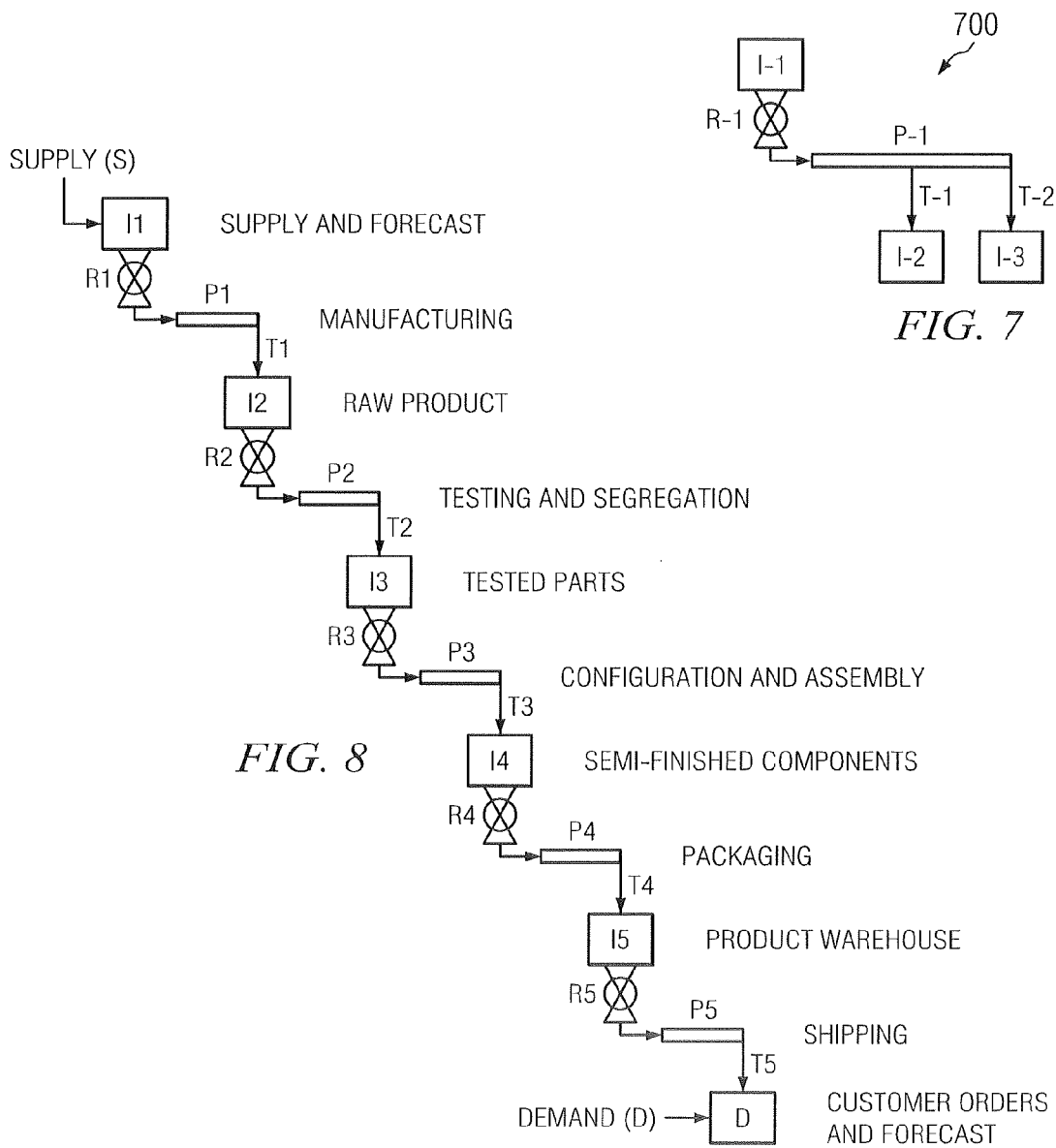
FIG. 7
FIG. 8

SYSTEM AND METHOD FOR DISCRETE SUPPLY CHAIN CONTROL AND OPTIMIZATION USING MODEL PREDICTIVE CONTROL

CROSS-REFERENCE TO RELATED APPLICATIONS

This application is related to U.S. patent application Ser. No. 12/098,929 filed on Apr. 7, 2008 (now U.S. Pat. No. 8,036,758), which is hereby incorporated by reference.

COMPUTER PROGRAM LISTING APPENDIX

A computer program listing is set forth in an Appendix. The computer program listing is provided as a text file in compliance with the American Standard Code for Information Interchange (ASCII). The computer program listing set forth in the Appendix text file is hereby incorporated by reference. The name of the Appendix text file is H0018255.txt. The date of creation of the Appendix text file is Apr. 7, 2008. The size of the Appendix text file is 199 kilobytes.

COPYRIGHT NOTICE

A portion of the disclosure of this patent document (in the Computer Program Listing Appendix text file) contains material that is subject to copyright protection. The copyright owner has no objection to the facsimile reproduction by anyone of this patent document or the Appendix text file as it appears in the U.S. Patent and Trademark Office patent file or records, hut otherwise reserves all copyright rights and protection whatsoever.

TECHNICAL FIELD

This disclosure is directed in general to control systems for process facilities. More specifically, this disclosure is directed to a system and method for discrete supply chain control and optimization using model predictive control.

BACKGROUND

Many process facilities (such as manufacturing plants or crude oil refineries) are often managed using distributed control systems. Contemporary control systems often include numerous models tailored to control or monitor various processes associated with the facilities. Conventional systems link these modules together to produce the distributed nature of the control systems. This provides increased performance and the ability to expand or reduce the control system to satisfy changing facility needs.

Some control systems can be tailored to satisfy wide ranges of process requirements (such as global, local, or otherwise) and facility types (such as manufacturing or refining). These types of control systems are often designed with two principal objectives. One is to centralize control of as many processes as possible to improve the overall efficiency of a facility. Another is to support a common interface that communicates data among various modules controlling or monitoring the processes and also with any centralized controller or operator center.

Each process or group of associated processes being controlled often has certain input characteristics (such as flow, feed, or power) and certain output characteristics (such as temperature or pressure). In recent years, model predictive control ("MPC") techniques have been used to optimize certain processes as a function of such characteristics. One MPC technique uses algorithmic representations of certain processes to estimate characteristic values (often referred to as "controlled variables" represented as parameters, process variables, or estimated observations) associated with the processes in order to better control such processes. In recent years, physical, economic, and other factors have been incorporated into control systems for the associated processes.

Some process facility control systems have been designed to handle operations in a process facility that has a continuous supply chain. A continuous supply chain is one in which the inputs to the process (such as feed stocks or fuel supplies) are continuously supplied to the process. An example of an industrial plant that employs a continuous supply chain is an oil refinery. However, many manufacturing systems do not employ continuous supply chains but instead employ discrete supply chains. A discrete supply chain is one in which the inputs to a process are not continuously supplied to the process. An example of an industrial manufacturing process that employs a discrete supply chain is a semiconductor manufacturing process. Discrete supply chain processes are often systems of processes at different locations (sometimes globally dispersed), such as those used to accomplish the global manufacturing and distribution of associated products.

A semiconductor manufacturing process may produce semiconductor devices by building components such as transistors, interconnecting the components, and testing the components for initial functionality. Many processing steps, such as hundreds of steps, may be carried out in the manufacturing process. The manufacturing steps are highly re-entrant and may employ many different machine types over a lengthy period of time, such as dozens of different machine types used over a number of months.

In the assembly portion of the semiconductor manufacturing process, the semiconductor devices are then mounted in packages and tested for final functionality. This may involve many packaging steps and many different machine types over a lengthy period of time, such as dozens of packaging steps performed on twenty different machine types over a period of one or two weeks. Finally, the devices are configured, marked, packed, and shipped to customers. This could involve the performance of ten or more steps on ten or more machine types over a period of several days.

A manufacturing process that employs a discrete supply chain provides different complexities when compared to a manufacturing process that employs a continuous supply chain. For example, in a discrete supply chain, system dynamics can be complicated by highly re-entrant process flows. There is also a temporal randomness to the discrete supply chain. That is, the amount of time between steps may vary in a random way. There may further be uncertain production yields in the process and uncertain demand from the customers for the products. In addition, there may be a more complex supply network for obtaining the components to manufacture the products. These factors make it very difficult to provide manufacturing control and optimization for a manufacturing process that employs a discrete supply chain.

SUMMARY OF THE INVENTION

This disclosure provides a system and method for discrete supply chain control and optimization using model predictive control.

In a first embodiment, a system includes a first controller configured to monitor processes associated with a process facility and to generate control data for optimizing the process facility. The system also includes a second controller configured to use stochastic calculus of variations calculations to modify at least a portion of the control data. The second controller is configured to provide discrete supply chain control and optimization for the process facility and to track at least one of demand requirements and shipping requirements for product manufactured by a discrete supply chain manufacturing process. The system further includes third controllers configured to operate in accordance with the control data to control the processes and to optimize the process facility.

In a second embodiment, a method includes monitoring processes associated with a process facility and generating control data for optimizing the process facility. The method also includes modifying at least a portion of the control data using stochastic calculus of variations calculations to provide discrete supply chain control and optimization for the process facility and to track at least one of demand requirements and shipping requirements for product manufactured by a discrete supply chain manufacturing process. The method further includes controlling the processes in accordance with the modified control data to optimize the process facility.

In a third embodiment, an apparatus includes a first module configured to perform a scheduled to go function to keep track of inventory releases, the inventory releases made to satisfy a specified schedule for a product in a discrete supply chain manufacturing process. The apparatus also includes a second module configured to perform a target release function that uses unfilled releases and a number of control intervals remaining in a current period to calculate a target value for an intervals release. The first module is configured to use a disturbance variable to represent product orders, a controlled variable to represent unfilled product orders, and at least one manipulated variable to fill product orders. The second module is configured to use one of a manipulated variable and a controlled variable to specify the target value.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following descriptions taken in conjunction with the accompanying drawings, in which:

FIGS. 6 and 7 illustrate an example representation of a basic supply chain link according to this disclosure;

FIG. 8 illustrates an example representation of multiple supply chain links forming a discrete supply chain for the manufacture of semiconductor devices according to this disclosure;

DETAILED DESCRIPTION

FIGS. 1 through 12 and the various embodiments used to describe the principles of the present invention in this patent document are by way of illustration only and should not be construed in any way to limit the scope of the invention. Those skilled in the art will understand that the principles of the invention may be implemented in any type of suitably arranged process facility or network of facilities.

Figure 1:
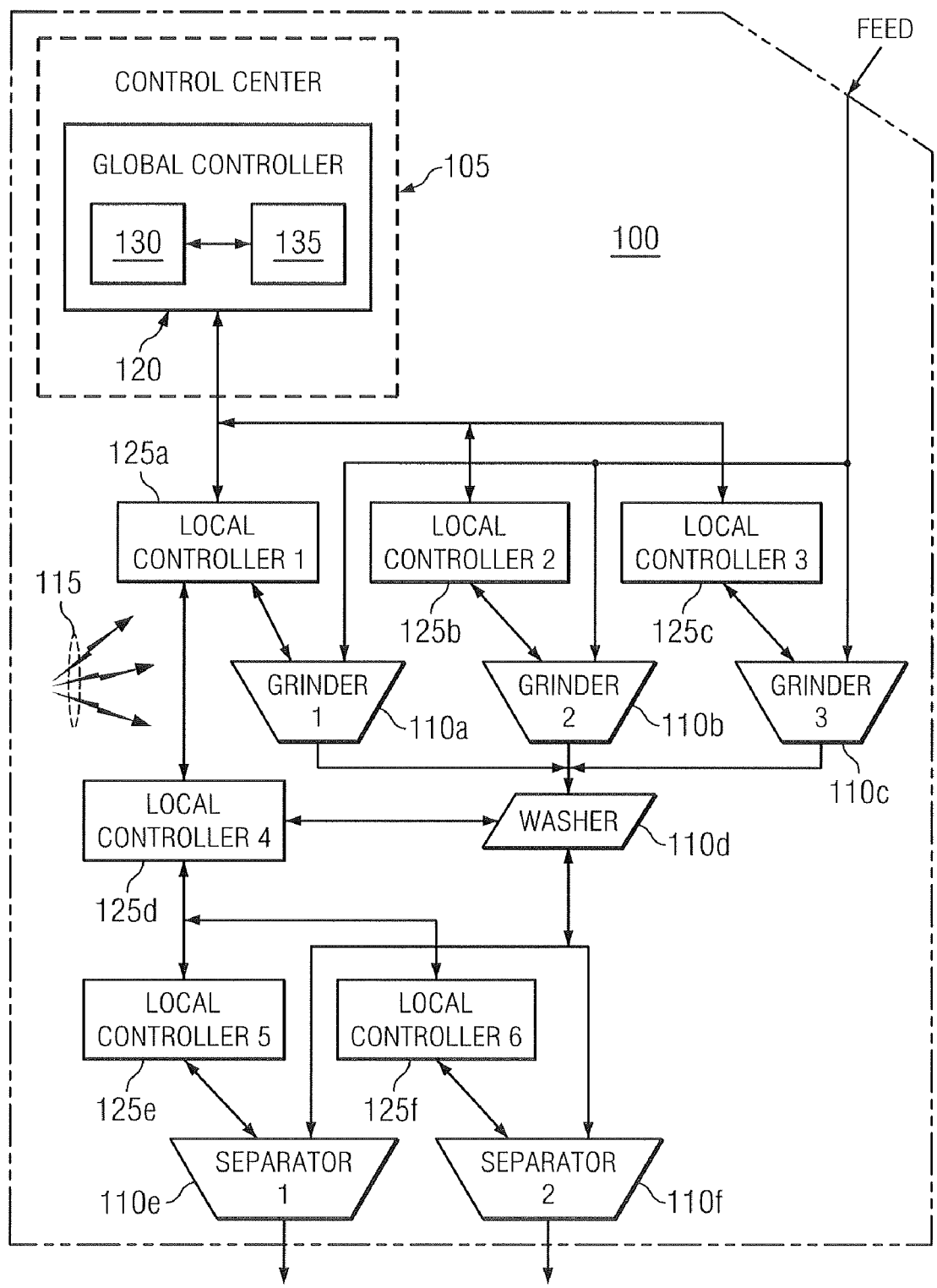
FIG. 1 illustrates an example process facility that performs operations with a continuous supply chain according to this disclosure.

FIG. 1 illustrates an example process facility 100 that performs operations with a continuous supply chain according to this disclosure. The embodiment of the process facility 100 shown in FIG. 1 is for illustration only. Other embodiments of the process facility 100 could be used without departing from the scope of this disclosure.

In this example, the process facility 100 performs operations in conjunction with a continuous supply chain with which a control system may be used. The process facility 100 processes raw materials and includes a control center 105, six associated processes 110a-110f arranged in three stages, and a control system 115.

The control center 105 may represent a central or other area that is commonly manned by one or more operators for monitoring and controlling the three process stages. A first process stage in this example includes three raw material grinders 110a-110c that operate to receive a "feed" of raw material and grind the raw material into smaller particles, such as by using a pulverizer or a grinding wheel. The second process stage includes a washer 110d that operates to receive the ground raw materials and clean the ground raw materials to remove residue from the first stage. The third process stage includes a pair of separators 110e-110f that operate to receive the washed raw materials and to separate the washed raw materials into desired minerals and any remaining raw materials. Since this type of process facility 100 is provided for purposes of illustration only and the principles of such a facility are well known, further discussion of the same is beyond the scope of this patent document and unnecessary.

The control system 115 in this example includes a global controller 120 and six local controllers 125a-125f. Each of these controllers could be implemented using any hardware, software, firmware, or combination thereof. As a particular example, each of the controllers could include at least one processor and at least one memory capable of storing instructions and data used, generated, or collected by that controller. Each of the controllers could also include at least one network interface for communicating over at least one network, such as an Ethernet interface. In these embodiments, the control functionality of a controller could be implemented in software and executed by a suitable computing system (such as standalone or network system). Examples of this include any of the AM K2LCN, AM K4LCN, AM HMPU, A×M, or like systems from HONEYWELL INTERNATIONAL INC.

The global controller 120 in this example includes a unified controller 130 and a comparison controller 135 (although each could be located in any other location, such as one that is remote from the global controller 120 and the process facility 100). If remote from the process facility 100, communications with the control system 115 may occur using one or more wired or wireless connections.

The global controller 120 is associated with each of the local controllers 125a-125f and the unified controller 130 to allow communication of information between the controllers. The global controller 120 directly or indirectly monitors characteristics of the associated processes 110a-110f (such as status, temperature, pressure, flow rate, inventory, current, voltage, power, utilization, efficiency, or cost and other economic factors), such as through the local controllers 125a-125f. Depending upon the specific implementation, this monitoring may be of an individual process, a group of processes, the facility 100, or multiple facilities 100.

The global controller 120 also communicates with each of the associated processes 110a-110f through each of the local controllers 125a-125f and with the unified controller 130. The global controller 120 further generates control data in order to optimize the process facility 100. At least a portion of the control data may then be modified by the unified controller 130. The phrase "control data" includes any numeric, qualitative, or other value(s) generated to control a process facility or portion thereof. The control can take various forms, such as directing, managing, modifying, recommending, regulating, suggesting, supervising, or cooperating with a process, group of processes, facility, group of facilities, process stage, group of stages, or sequence of processes or stages. In some embodiments, the control data is dynamically generated and is based at least upon a given facility's efficiency, production, or economic cost (and possibly all three).

A stochastic process (also called a random process) is a process in which there is some indeterminacy in its future evolution as described by probability distributions. Even if the initial starting point of a stochastic process is known, there are many possible directions in which the process might go. Generally, some of the possible paths are more probable, and some of the possible paths are less probable. A stochastic process differs in this respect from a deterministic process in probability theory. A deterministic process has only one possible direction in which it will go.

In a continuous supply chain process, a step/impulse response value follows a deterministic process. For example, a temperature in a process moves in a continuous manner from temperature A to temperature B in a complete response to a heat input change to that process. In a discrete supply chain process, a step/impulse response can be assigned a probability of occurrence. For example, a probability can be assigned to the likelihood that a transportation time is three days or less for a package shipped from source A to destination B. For convenience, the probability of occurrence is designated p. For a continuous or discrete process with stochastic response characteristics, p takes a real value greater than zero but smaller than one. Any process with deterministic response characteristics can be viewed as a special case of a stochastic process in which the probability p for its response characteristics is equal to one. Examples of the step/impulse response of a discrete supply chain are provided in FIGS. 9A and 9B, which are described below.

In a discrete manufacturing or supply chain process, the probability value p of a particular step/impulse response can change over time. For the purposes of this disclosure, the time in which a response is expected to occur is referred to as the response horizon. Therefore, in a discrete supply chain process, it is possible that the probability value p of a particular step/impulse response can change during the response horizon. For many types of discrete processes, the probability value p approaches a value of one as the response horizon approaches infinity. For control and optimization purposes, however, the probability is sufficiently close to one at some finite response horizon.

There are several significant differences between a continuous process and a discrete process. For example, in a continuous process, dynamic models may not be easy to obtain. A significant amount of effort and expense may be required to obtain a dynamic model for a continuous process. In contrast, dynamic models are often easier to obtain for a discrete process. That is, less effort and expense may be required to obtain a dynamic model for a discrete process. Also, in a continuous process, the model quality may generally be low, both structurally and parametrically. In a discrete process, the model quality is generally high if not perfect, although parametric uncertainty may be high in a discrete process. Further, in a continuous process, the model often changes over time, and the model for a continuous process often has robust control and good schemes of maintenance. In a discrete process, there are often many different grades, runs, or batches, and the model for each in a discrete process has to be appropriately scheduled. Lastly, in a continuous process, the execution frequency is often high, typically on the order of per minute or per second. In a discrete supply chain process, the execution frequency is often low, typically on the order of hours, days, or weeks.

The unified controller 130 here provides model predictive control (MPC) using range control. The unified controller 130 does this using a stochastic calculus of variations approach to provide discrete or continuous supply chain control and optimization for a process facility. The theory of stochastic calculus of variations is also referred to as "Malliavin calculus." Malliavin calculus provides mathematical techniques that can be used to compute derivatives of random variables.

The unified controller 130 handles discrete system characteristics of supply chain dynamics as an inventory control and optimization problem using range control. The unified controller 130 is able to handle both continuous system characteristics and discrete system characteristics. One example of the operations performed by the unified controller 130 is defined by the instructions contained in the attached software appendix. An operating system interface program could coordinate the operation of the instructions in the software appendix with the operating system of the unified controller 130.

The unified controller 130 is able to handle a large amount of uncertainty using available data on supply and demand forecasts. The unified controller 130 is also able to solve a large supply chain system within a reasonable amount of time. The unified controller 130 receives and modifies control data from the global controller 120 and provides the control data to the local controllers 125a-125f. The local controllers 125a-125f, which are also monitoring the associated processes 110a-110f, operate to varying degrees in accordance with the control data to control the associated processes and, more particularly, to modify one or more of the associated processes 110a-110f and improve the monitored characteristics and facility 100 as a whole. The control system 115 therefore enables both global and local monitoring and cooperative control of the associated processes 110a-110f using varying degrees of compliance with the control data. The unified controller 130 could be implemented in any suitable manner, such as by using PROFIT CONTROLLER from HONEYWELL INTERNATIONAL INC. and the instructions listed in the software appendix. The unified controller 130 could also be implemented using technology described in the following U.S. Pat. Nos. 5,351,184; 5,561,599; 5,572,420; 5,574,638; 5,758,074; 6,055,483; 6,122,555; 6,347,254; 6,542,782; and 6,253,113.

One aspect of the control system 115 is that one or more of the processes 110a-110f and the facility 100 as a whole (or more than one such facility) may be dynamically and cooperatively controlled as a function of local and global optimization efforts. Also, such dynamic and cooperative control can be independent of the relationship between the global controller 120 and the specific local controllers 125a-125f. The relationship between the global controller 120 and various ones of the process controllers 125a-125f may be master-slave (full compliance), cooperative (varying compliance, such as by using the supervisory data as a factor in controlling the associated processes), or complete disregard (noncompliance). Depending upon the specific implementation and the needs of a given facility 100, the relationship between the global controller 120 and a specific local controller may be static (such as always only one of compliance, cooperative, or noncompliance), dynamic (such as varying over time, like within a range between compliance and noncompliance or some lesser range in between), or switching between static periods and dynamic periods.

Although FIG. 1 illustrates one example of a process facility 100 that performs operations with a continuous supply chain, various changes may be made to FIG. 1. For example, the process facility 100 could include any number of processes, control systems, and controllers.

Figure 2:
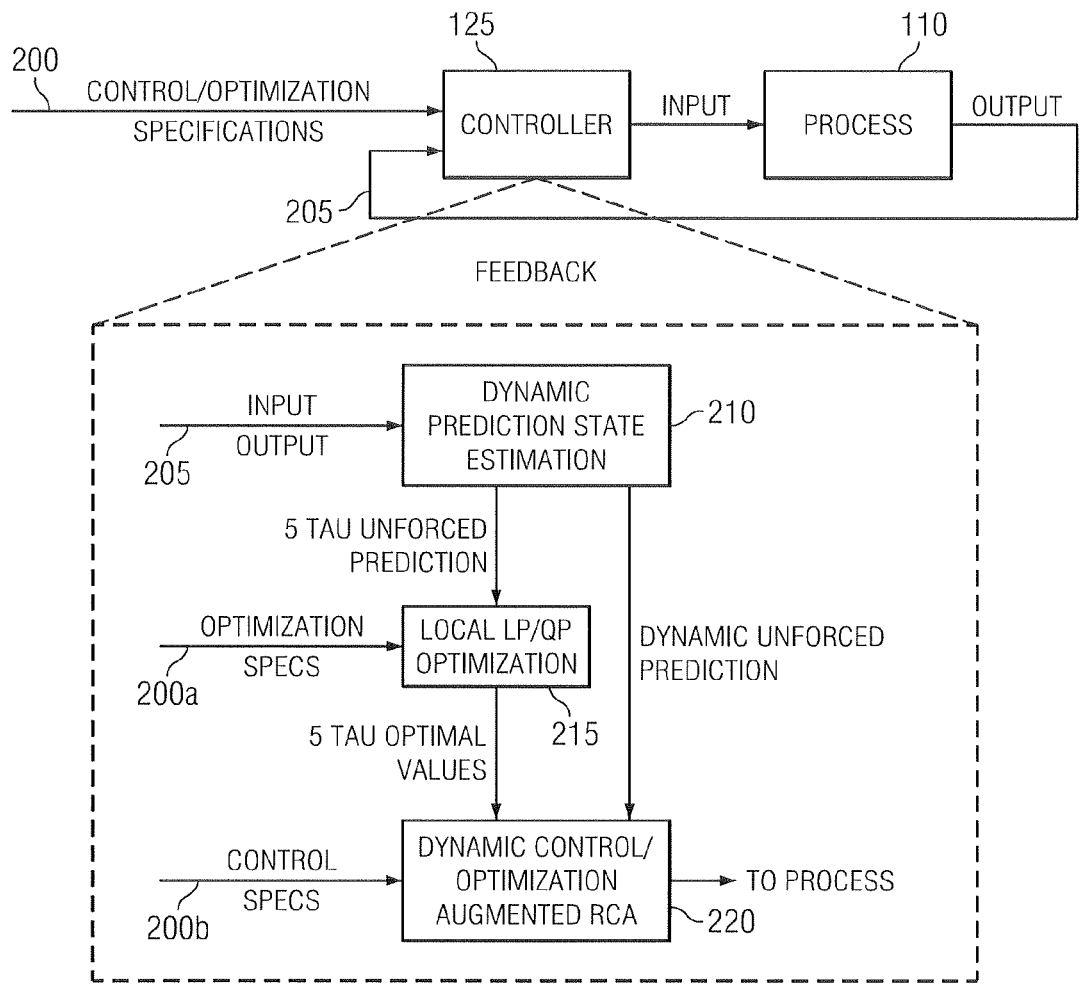
FIG. 2 illustrates an example controller for use in controlling a portion of a process facility according to this disclosure.

FIG. 2 illustrates an example controller 125 for use in controlling a portion of a process facility according to this disclosure. In particular, FIG. 2 illustrates an example of one of the local controllers 125a-125f in the system 100 of FIG. 1. The embodiment of the controller 125 shown in FIG. 2 is for illustration only. Other embodiments of the controller 125 could be used without departing from the scope of this disclosure.

In this example, the controller 125 is associated with one or a group of processes 110. The controller 125 could be implemented using any hardware, software, firmware, or combination thereof. As a particular example, the controller 125 could be implemented using PROFIT CONTROLLER from HONEYWELL INTERNATIONAL INC.

In the illustrated embodiment, the local controller 125 receives as inputs control/optimization specifications 200 (such as bounds, ranges, tolerances, or control points) and feedback data 205 (such as output of an associated process 110). The control/optimization specifications 200 may be received from any of a number of sources depending upon the associated process or group of processes 110, the facility 100, or other factors. For example, any of the control/optimization specifications 200 may be received from an operator of the control center 105, retrieved from a database or data repository, receive from other local controllers, or received from the global controller 120.

The control/optimization specifications 200 include two types of variables: (1) manipulated variables ("MVs") that may be manipulated, such as flow rate, feed temperature, or air blower speed; and (2) disturbance variables ("DVs") that cannot be manipulated, such as burn rate, fuel quality per unit, or ambient temperature. Feedback data 205 represents controlled variables ("CVs") that are responsive to the MVs and DVs. The CVs are outputs of the associated process(es) 110, such as pressure, temperature, or inventory. Any or all of the MVs, DVs and CVs represent characteristics of the associated process(es) 110 that may be suitably monitored by the local controller 125 and, directly or indirectly, by the global controller 120.

The local controller 125 includes a dynamic prediction task with state estimation 210, a local linear program/quadratic program ("LP/QP") optimization task 215, and a dynamic control/optimization augmented range control algorithm ("RCA") 220. The dynamic prediction task 210 receives the CVs and operates to generate an array of multiple predictions (or dynamic unforced predictions) and an unforced prediction for values associated with the associated process(es) 110. The unforced prediction could be made at "5 tau" (response time close to complete response). The local LP/QP optimization task 215 receives optimization specifications 200a and, in response to the unforced prediction, generates optimal values associated with the associated process(es) 110 (such as at 5 tau). The optimization specifications 200a can be associated, directly or indirectly, with an economic value of the output of the associated process(es) 110. The dynamic control/optimization augmented RCA 220 receives control specifications 200b and, in response to receiving the array of multiple predictions from the dynamic prediction task 210 and the optimal values from the local LP/QP optimization task 215, generate control values that are input to the associated process(es) 110. The local controller 125 here can use control/optimization specifications 200 and feedback data 205 to locally unify economic/operational optimization with MPC (model predictive control) dynamically for a specific process or group of processes.

Figure 3:
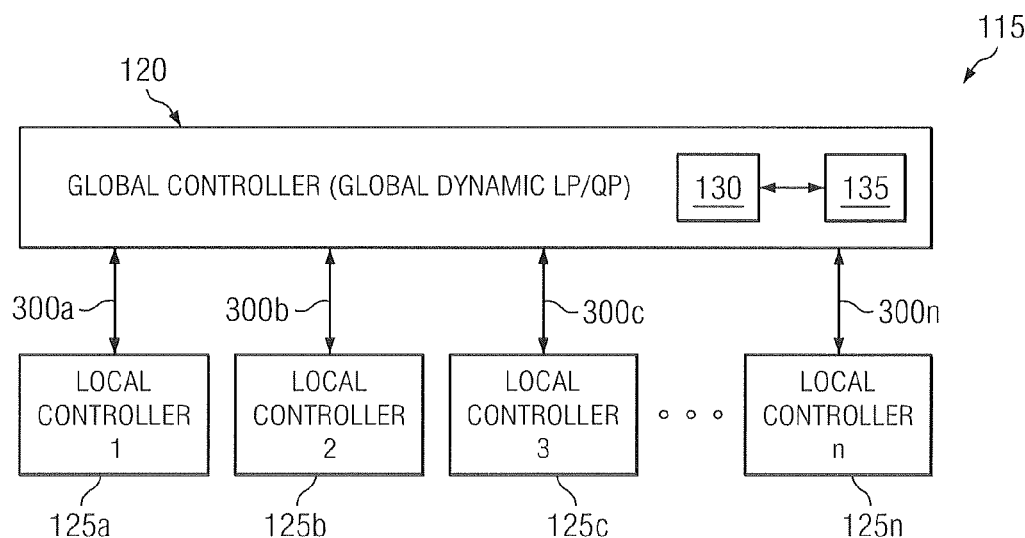
FIG. 3 illustrates an example control system for controlling a process facility according to this disclosure.

FIG. 3 illustrates an example control system 115 for controlling a process facility according to this disclosure. As shown in FIG. 3, the control system 115 includes the global controller 120 (such as a global dynamic LP/QP program controller), multiple local controllers 125a-125n (such as those implemented as shown in FIG. 2), the unified controller 130, and the comparison controller 135.

In this example, the communication of control data and characteristics of the associated processes 110 occurs over communication paths 300a-300n, which could be synchronous or asynchronous. As previously mentioned, the process facility 100 shown in FIG. 1 includes three process stages (grinding, washing, and separating) that cooperate to process raw materials. These three stages are interrelated and, according to the illustrated embodiment, cascaded. Cascaded processes generally represent those where the output of at least one process feeds into the input of at least one other process (sub-processes could also be cascaded). Using the concepts of MVs, DVs, and CVs and referring concurrently to FIG. 1, the cascading of the illustrated process may be described as follows:

(1) MVs and DVs associated with the grinding process (grinders 110a-110c) are input to the grinding processes;

(2) Any of the MVs and DVs input to any of the grinding processes (grinders 110a-110c) and any resulting CVs thereof may be input as DVs, along with the MVs and DVs associated with the washing process (washer 110d), into the washing process; and (3) Any of the MVs and DVs input to any of the grinding processes (grinders 110a-110c) and any resulting CVS thereof and any of the MVs and DVs input to the washing process (washer 110d) and any resulting CVs thereof may be input as DVs, along with the MVs and DVs input to the separating processes (separators 110e-110f), into either of the separating processes.

Figure 4:
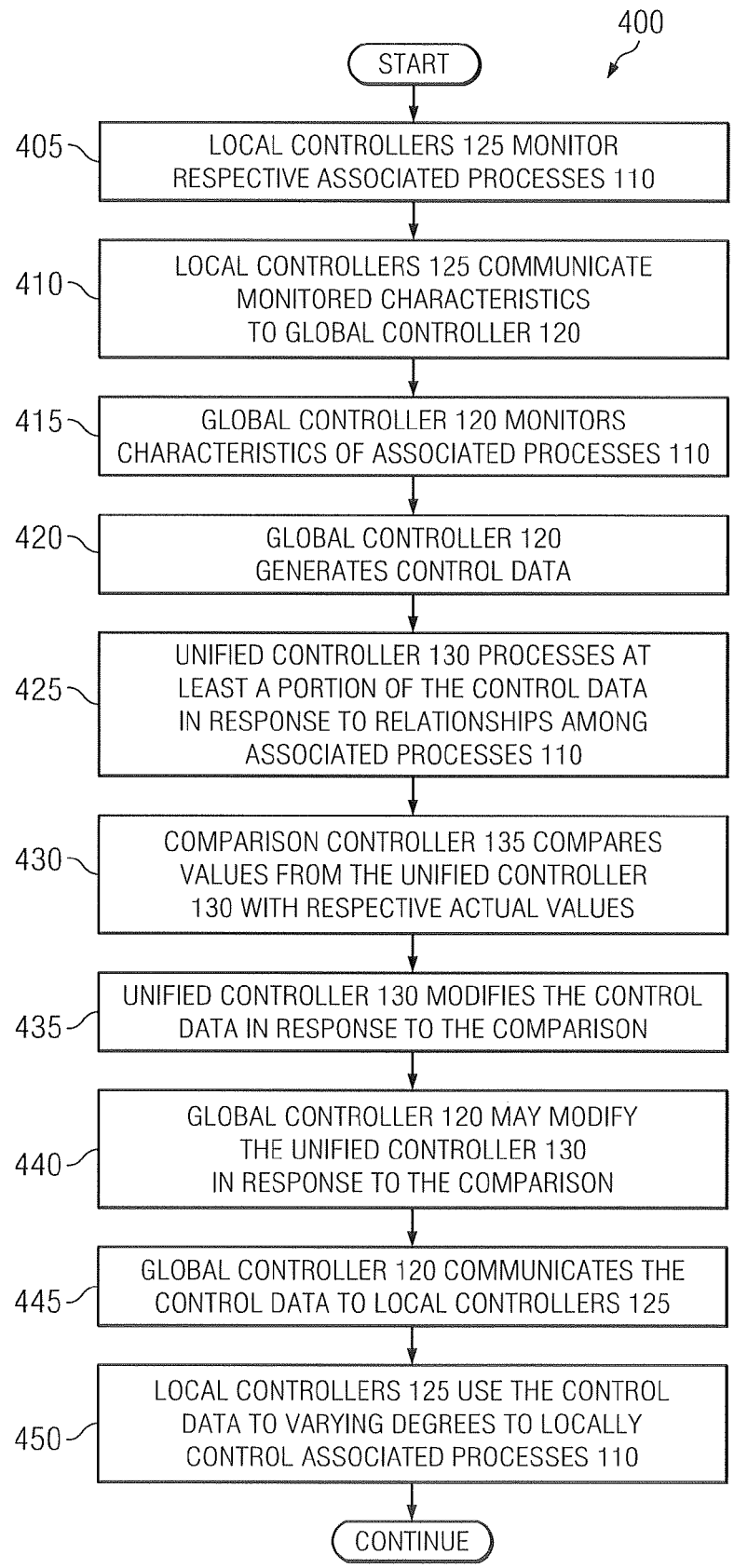
FIG. 4 illustrates an example method for controlling a process facility according to this disclosure.

FIG. 4 illustrates an example method 400 for controlling a process facility according to this disclosure. The method 400 operates (such as in the control system 115) to globally optimize a process facility 100. For the purpose of illustration, concurrent reference is made to FIGS. 1-3. At the beginning of the method 400, each of the local controllers 125a-125n continuously monitors its respective associated process(es) 110 at step 404. This could include each local controller monitoring characteristics of the associated process(es) 110 like output and other measurable data incident thereto (including pressure, temperature, or other CVs).

The local controllers 125a-125n communicate such monitored characteristics to the global controller 120 at step 410. The global controller 120 globally monitors the characteristics of the associated processes 110 through the local controllers 125a-125n at step 415. In other embodiments, the global controller 120 may suitably globally monitor the associated processes 110 directly.

The global controller 120 includes or supports an economic objective function (J). For example, the economic objective function could equal (at 5 tau) a summation of the dynamic LP/QP coefficients (linear/quadratic objective functions) of the local controllers 125a-125n, which can be expressed as:

$$J=LP/QP1+LP/QP2+LP/QP3+\ldots+LP/QPn.$$

Each local controller 125a-125n can update its CV predictions and constraints according to the embodiment that is shown in FIG. 2 and communicate model information (such as on-the-fly model updates), dynamic predictions, current CV/MV/DV values, status and constraints, and objective functions.

The global controller 120 generates, in response to the received monitored characteristics, control data for dynamically optimizing the process facility 100 at step 420. For example, the global controller 120 can combine the multiple dynamically received LP/QP coefficients as set forth above to solve for a global LP/QP (control data according to the illustrated embodiment). Thus, the global controller 120 can use an economic-based optimization parameter, although any suitable optimization algorithm, procedure, equation, or the like may be used (such as those that are at least substantially global facility-wide).

At least a portion of the control data is communicated to the unified controller 130. The control data is processed in response to certain relationships among two or more of the associated processes 110 to predict values of certain characteristics of the associated processes 110 at step 425. For example, the unified controller 130 may predict each of a current time value ($t_O$) and a future time value ($t_x$) for the portion of the control data as the control data relates to the associated processes 110. The unified controller 130 could also provide enough points between the current and future values to supply a predicted slope or trend of a given process or group of processes with respect to the portion of the control data (such as an array of predicted values).

The comparison controller 135 compares those portions of the control data that represent the predicted values of characteristics of the associated processes 110 with their respective actual (current real) values as monitored by the local controllers at step 430. For example, the comparison controller 135 could compare an actual time value (time $t_O$) of the portion of the control data and the current and future values of the portion predicted by the unified controller 130. The unified controller 130 may modify the portion of the control data in response thereto to further optimize the process facility 100 at step 435.

The global controller 120 may modify the unified controller 130 in response to the comparison in which the comparison controller 135 determined an efficiency (such as productivity, cost, capability, worth, or profit) of at least a portion of the unified controller 130 at step 440. Such dynamic modifications can work to improve an efficiency of the unified controller 130 and to further optimize the process facility 100. For example, the global controller 120 or some other part of the control system 115 may track a performance characteristic of the unified controller 130 and compare the performance characteristic with a threshold or the like. In the event that the performance characteristic compares unfavorably, the unified controller 130 or some poorly performing part thereof may be dynamically modified to improve its performance.

The unified controller 130 may use any suitable model or modeling technique to modify the control data from the global controller 120. For example, the unified controller 130 may use any suitable model or modeling technique to understand or predict the association, behavior, function, operation, performance, or the like among the associated processes 110.

The global controller 120 communicates the control data to the local controllers 125a-125n at step 445. The local controllers 125a-125n use the control data to varying degrees to locally control the associated processes 110 to optimize the process facility 100 at step 450. The optimization solution is thus integrated into each local controller (such as into the PROFIT CONTROLLER control solution in the local controller).

It may be noted that the control data here provides a dynamically updated global optimization solution for the "stead state" optimization horizon in the process facility 100. The global solution is used, to varying degrees, by the local controllers to optimize associated processes 110 in response to a desired facility-wide optimization solution, which may be largely economic-based. As previously noted, such varying degrees of compliance with the control data may suitably range between compliance and noncompliance with the same. The local controllers 125a-125n may dynamically vary their respective degree (range) of compliance. Accordingly, a particular local controller may have a cooperative association, a direct association, or a "Pro-Only" (on your own) association with the control data. These are described in greater detail in U.S. Pat. No. 6,122,555. In other embodiments, multiple local controllers may have various static degrees of compliance or some combination of degrees of compliance.

It may again be noted that the global controller 120 is termed "global" because it monitors all (or at least a substantial number) of associated processes 110, either directly, indirectly, or through a suitable combination thereof. In addition, while the functions of the global controller 120 have been illustrated as being centralized, its functionality may be suitably distributed throughout the process facility 100. Similarly, the local controllers 125a-125n are termed "local" because each is associated with a specific process, group of processes, or portion thereof. This may be true regardless of the physical location or proximity of the local controllers with respect to the associated processes 110. Although the functions of local controllers 125a-125n have been illustrated as being distributed, their functionality may be centralized somewhere in the process facility 100. In addition, the functionality of the controllers 120 and 125 may be collectively distributed or centralized or partially distributed and centralized, depending upon the needs of the process facility 100 to be controlled.

It should also be noted that the use of modeling techniques to improve the cooperation between the global controller 120 and the local controllers 125 may be of any suitable type. For example, any unified controller 130 that modifies at least a portion of the control data in response to relationships among the associated processes 110 could be used. This functionality may be distributed, localized, centralized, or otherwise implemented.

Figure 5:
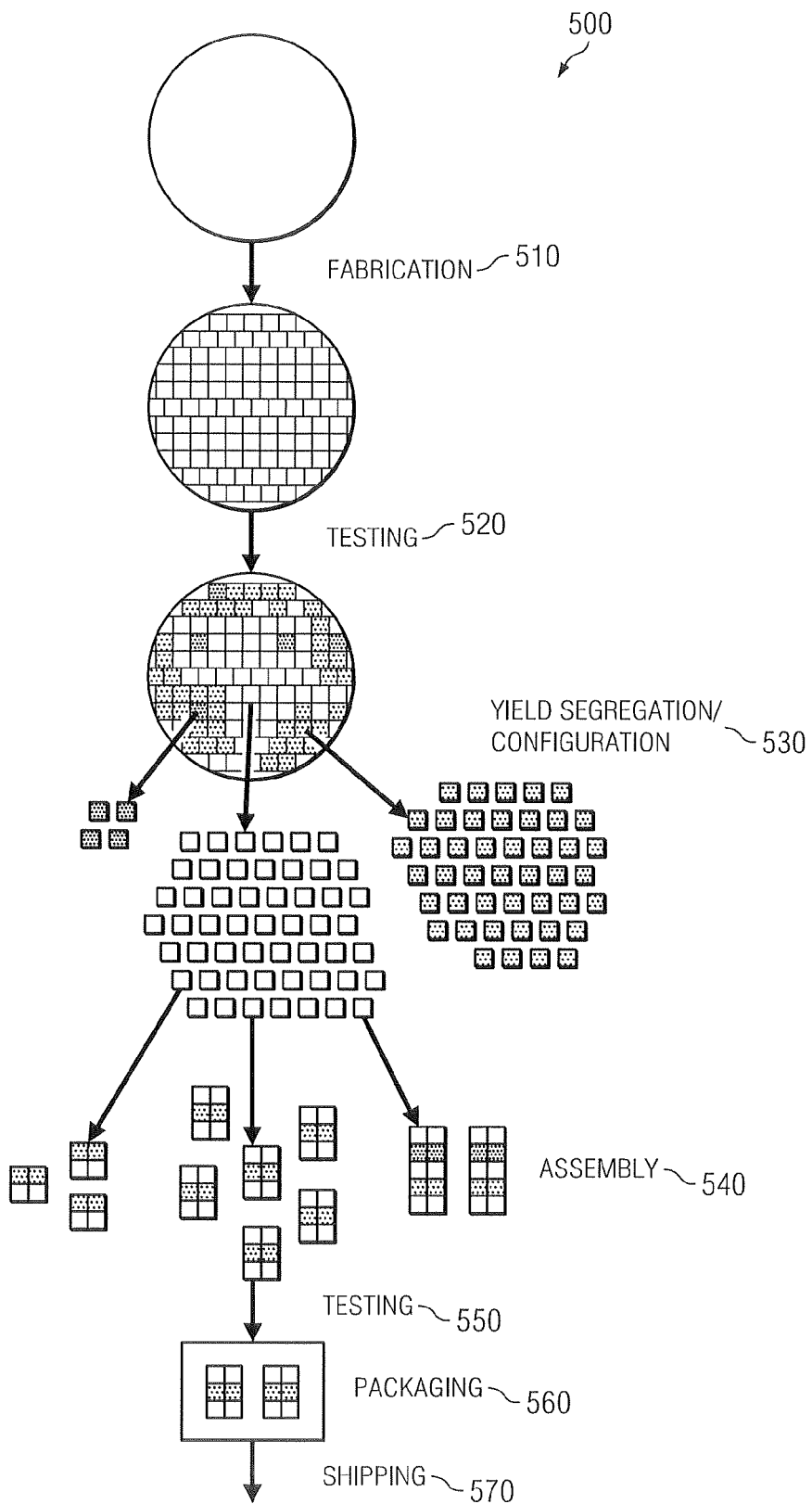
FIG. 5 illustrates an example process facility that performs operations with a discrete supply chain according to this disclosure.

FIG. 5 illustrates an example process facility 500 that performs operations with a discrete supply chain according to this disclosure. The embodiment of the process facility 500 shown in FIG. 5 is for illustration only. Other embodiments of the process facility 100 could be used without departing from the scope of this disclosure.

The unified controller 130 that has been previously described operates on both a continuous supply chain and on a discrete supply chain. The process facility 500 performs operations with a discrete supply chain to manufacture semiconductor devices.

As shown in FIG. 5, the process facility 500 generally includes a fabrication process 510 followed by a testing process 520. A yield segregation/configuration process 530 is then performed, followed by an assembly process 540 and an additional testing process 550. After that, a packaging process 560 is performed, followed by a shipping process 570. Several such processes may run in parallel, sharing equipment at the same facility or at separate facilities. The various processes 510-570 of the discrete supply chain manufacturing process facility 500 can be controlled by the control system 115 (including the unified controller 130) in the manner that has been previously described.

FIGS. 6 and 7 illustrate an example representation of a basic supply chain link according to this disclosure. In FIG. 6, a basic supply chain link 600 is shown. The first portion of the basic supply chain link 600 includes a first inventory (designated Inventory One 610). Products that are located in Inventory One 610 are released in a step that is designated as Release From Inventory 620. The products that are released from Inventory One 610 are processed in a manufacturing process that is designated as Processing 630. The manufacturing process 630 may include a fabrication process, an assembly process, a packaging process, a finishing process, or the like (such as those shown in FIG. 5). The manufacturing process 630 may also include one or more testing processes (such as those shown in FIG. 5).

After the manufacturing process 630 has been completed, the manufactured product is transported to a new inventory. As shown in FIG. 6, a first transport step 640 moves the product to a second inventory (designated Inventory Two 650). A second transport step 650 moves the product to a third inventory (designated Inventory 670).

The basic supply chain link 600 that is shown in FIG. 6 can therefore be summarized using the representation 700 shown in FIG. 7. The first inventory 610 is represented in FIG. 7 as a box designated I-1. The release from inventory step 620 is represented as a valve that is designated R-1. The manufacturing and testing process 630 is represented by a rectangle designated P-1. The transport step 640 is designated T-1. The transport step 660 is designated T-2. The second inventory 650 is represented by a box designated I-2. The third inventory 670 is represented by a box designated I-3.

FIG. 8 illustrates an example representation 800 of multiple supply chain links forming a discrete supply chain for the manufacture of semiconductor devices according to this disclosure. As shown in FIG. 8, the representation 700 of a basic supply chain link 600 may be used to summarize a process for manufacturing semiconductor devices. In FIG. 8, the arrow designated Supply (S) represents a product that is supplied to the first inventory I1 (designated Supply and Forecast). The control point designated R1 releases the product from the first inventory I1 to the manufacturing process P1 (designated Manufacturing). Transport T1 transports the manufactured product to the second inventory I2 (designated Raw Product).

The control point designated R2 releases the product from the second inventory I2 to a testing and segregation process P2 (designated Testing and Segregation). Transport T2 transports the tested product to the third inventory I3 (designated Tested Parts). The control point designated R3 releases the product from the third inventory I3 to a configuration and assembly process P3 (designated Configuration and Assembly). Transport T3 transports the configured and assembled product to the fourth inventory I4 (designated Semi-Finished Components).

The control point that is designated R4 releases the product from the fourth inventory I4 to a packaging process P4 (designated Packaging). Transport T4 transports the packaged product to the fifth inventory I5 (designated Product Warehouse). The control point that is designated R5 releases the product from the fifth inventory I5 to a shipping process P5 (designated Shipping). Transport T5 transports the product in accordance with the customer orders. The customer orders are designated Customer Orders and Forecast (designated with the letter D). The arrow that is designated Demand (D) in FIG. 8 represents product orders from customers (actual and anticipated/forecasted).

The control system 115 (including the unified controller 130) controls the various processes of both a discrete supply chain manufacturing process and a continuous supply chain manufacturing process in the manner that has been previously described. The system and method are able to handle both the continuous dynamics of a manufacturing process and the discrete dynamics of a manufacturing process. The system and method are also able to handle both deterministic system behaviors (for continuous supply chain control and optimization) and stochastic system behaviors (for discrete supply chain control and optimization). Of course, the control system 115 could be implemented in a system that only uses discrete supply chain manufacturing processes or only continuous supply chain manufacturing processes. The system and method are further able to handle the re-entrant dynamics and re-entrant system behaviors that occur in some processing equipment.

Figure 9:
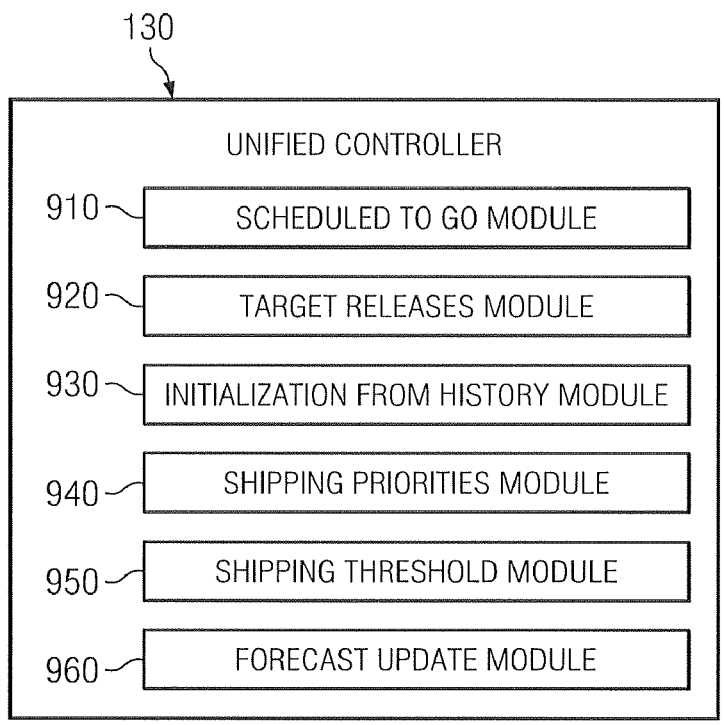
FIG. 9 illustrates an example unified controller according to this disclosure.

FIG. 9 illustrates an example unified controller 130 according to this disclosure. The embodiment of the unified controller 130 shown in FIG. 9 is for illustration only. Other embodiments of the unified controller 130 could be used without departing from the scope of this disclosure.

The modules within the unified controller 130 shown in FIG. 9 can efficiently keep track of supply and demand forecasts for one or more manufactured products, as applicable to a single processing step or network of steps. The modules include a Scheduled To Go Module 910, a Target Releases Module 920, an Initialization From History Module 930, a Shipping Priorities Module 940, a Shipping Threshold Module 950, and a Forecast Update Module 960.

In some embodiments, the Scheduled To Go Module 910 keeps track of inventory releases that are made for satisfying a specified schedule, such as a weekly schedule. The beginning day of the week and time can be specified, and the Scheduled To Go Module 910 keeps track of the current day of the week. The Scheduled To Go Module 910 also permits unfilled or overfilled quantities to be rolled over from the preceding week when a new week begins. Though the example of a "week" is used here, other defined time periods could also be used, such as "month" and "quarter."

The Scheduled To Go Module 910 uses a disturbance variable (DV) to represent orders during the orders period. Orders are pulsed to the disturbance variable (DV) at the end of the preceding forecast interval. Orders for future periods can be represented in a DV prediction vector as pulses for each period.

The Scheduled To Go Module 910 uses a controlled variable (CV) to represent unfilled orders. The controlled variable (CV) can be given a setpoint equal to zero (or another value representing a safety stock). A desired closed-loop response time is specified that is no greater than the orders period. The value of the controlled variable (CV) is calculated by the Scheduled To Go Module 910. As shipments are made to satisfy the orders, the value of the controlled variable (CV) is decremented.

The Scheduled To Go Module 910 uses at least one manipulated variable (MV), the shipping source(s), to fill the orders. In order to mitigate overshipping, the Scheduled To Go Module 910 programmatically sets an upper control limit of the manipulated variable(s) to the amount of unfilled orders (the value of the controlled variable CV). If more than one manipulated variable can fill the order, the Scheduled To Go Module 910 incorporates a controlled variable whose upper control limit is the value of the orders controlled variable.

The Target Releases Module 920 uses the unfilled releases and the number of control intervals remaining in the current week (or other time period) to calculate a target value for the intervals release. If a weekly schedule is desired, the Target Releases Module 920 uses the output of the Scheduled To Go Module 910, which keeps track of the unfilled releases and remaining intervals in the week. This information is passed to the Target Release Module 920.

The Target Release Module 920 is configured to act as an internal controller that removes a degree of freedom from the unified controller 130 to satisfy or pursue the releases target. The Target value is specified and the period over which the target value needs to be met is specified. If a manipulated variable target is used to specify the releases target, the manipulated variable can be given the target value. An optimization target can be configured to pursue the target schedule at the optimization speed, or a control target can be configured to meet the target schedule.

If a control target is configured, the manipulated variable is given a specific value and removed from use by the optimization algorithm of the unified controller 130. The schedule is met if there is a sufficient supply available. If an optimization target is configured, the manipulated variable can pursue the target value and may not meet the pre-programmed releases due to competing objectives.

If a controlled variable target is used to specify the releases target, the controlled variable can be given a target value. An optimization target can be configured, or a control target can be configured. In either the optimization target configuration or the control target configuration, competing control and optimization objectives can slow down the fulfillment of the target.

The initialization From History Module 930 initializes the unified controller 130 from a database that contains historical process values. Model predictive controllers (including the unified controller 130) can have a prediction initialization period that is approximately equal to the natural complete response time of the system. The prediction initialization period is typically ten (10) to one hundred (100) controller execution intervals long. The controller solution can be inappropriate before initialization has been completed. Therefore, using the controller solution before initialization has been completed should be done cautiously. Systems with integrating controlled variables may be particularly sensitive to this effect. For systems with complete response times that are on the order of an hour, waiting for an hour is usually not a large inconvenience. For supply chain systems whose response times can be days, weeks, or months, such a wait time would be unacceptable. In addition, integrating controlled variables are typically prevalent is such systems.

To solve this problem, the Initialization From History Module 930 cam read values from a historical database and initialize the unified controller 130 so that it can be fully initialized within a short period (such as minutes) since historical data is available in the database. The Initialization From History Module 930 is also used to initialize the Schedule To Go Module 910 and the Forecast Update Module 960.

The Shipping Priorities Module 940 provides priorities to underlying logistical subsystems of the system. The unified controller 130 may be configured to specify how much of a specific supply stream should be shipped to different locations over a specified control period. The solution can be passed to an underlying shipping control (logistics) subsystem whose shipping decisions are based on priorities, as well as quantities. The Shipping Priorities Module 940 calculates the relative urgency of each shipping destination. The Shipping Priorities Module 940 uses inventory predictions, inventory control limits, and demand forecasts to determine the relative priorities. The shipping priorities can be passed to the underlying shipping subsystem.

The Shipping Threshold Module 950 removes specifying that product be released from inventory if the quantity calculated by the unified controller 130 is below a specified value. In some systems, discrete components need to be shipped in packages of large quantities, and it may be disadvantageous to ship a full package when the controller solution indicates that relatively few components are needed. Such packages are then available to ship to destinations with greater needs. The Shipping Threshold Module 950 sets a manipulated variable's solution value to zero if that solution value is less than the specified threshold.

The Forecast Update Module 960 transforms forecast values from the user perspective to the controller perspective. The function of the Forecast Update Module 960 is equally applicable to both supply forecast signals and demand forecast signals. For example, a user perspective may be "the expected supply quantity of part A for the current forecast week, beginning on Monday at six o'clock a.m." Another example of a user perspective may be "the expected changes in feed flow rates in cubic meters per day over the next twenty four hours." An example of a controller perspective would be "the expected value of the disturbance variable at one (1), two (2), four (4), eight (8), twelve (12), and twenty (20) control variables in the future." The forecast function keeps track of the current time and day of the week (or other period) and the defined starting day and time of the week (or other period). At each control interval, forecasts can be adjusted (in user configurable manners) for deviations of the actual supply or demand quantities from their respective forecasts. Future weekly or other forecasts can be adjusted likewise at the beginning of each new week or other time period. A single instance of the forecast function can accommodate and prioritize a mixture of forecast periods. For example, the forecast values may be provided based on supply expected to arrive in each of the next four operating shift periods, as well as what total supply is expected to arrive in the current week and current month.

Figure 10:
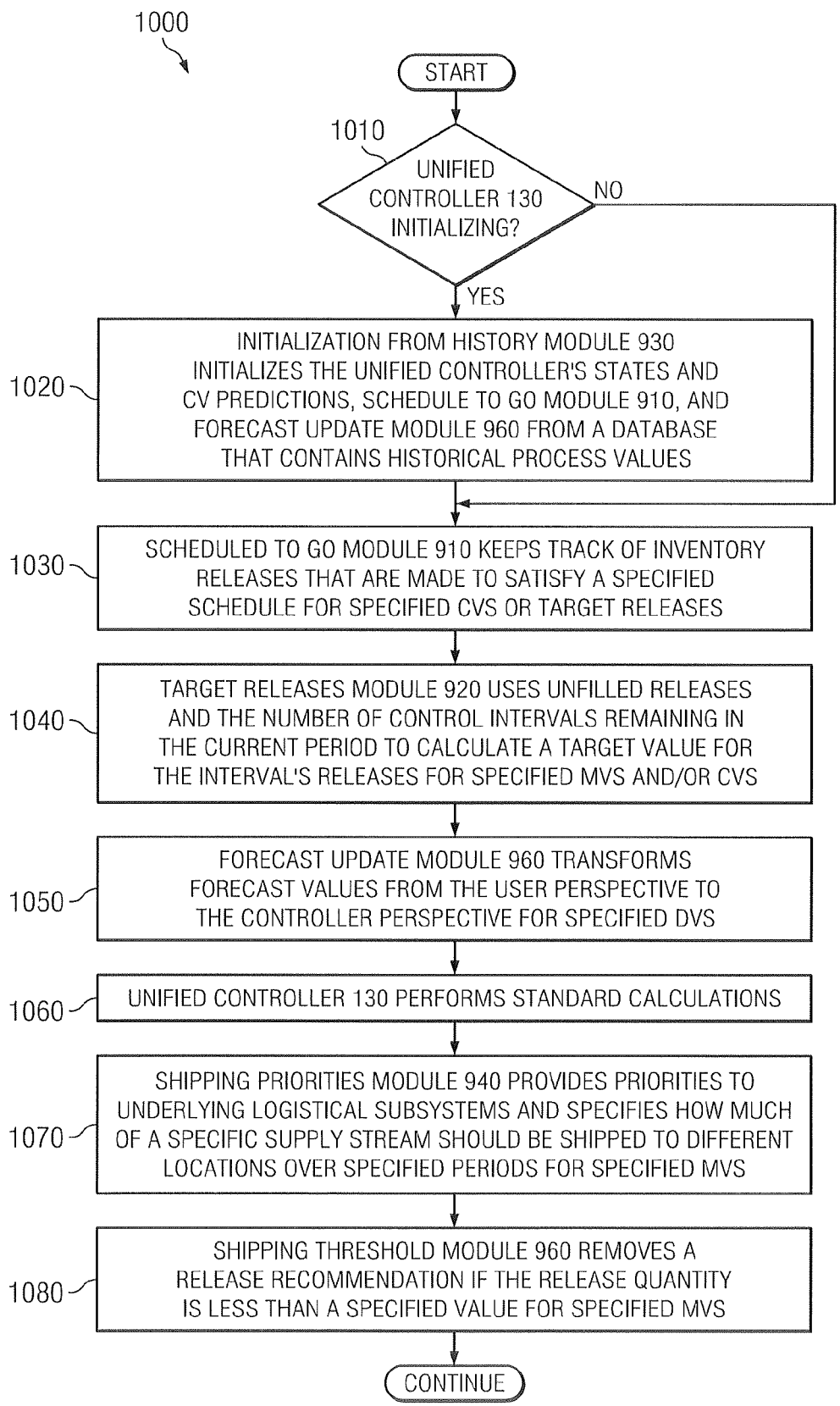
FIG. 10 illustrates an example method for controlling a process facility using a unified controller according to this disclosure.

FIG. 10 illustrates an example method 1000 for controlling a process facility using a unified controller 130 according to this disclosure. A determination is made whether the unified controller 130 is being initialized at step 1010. If so, the Initialization From History Module 930 initializes the unified controller 130 from a database that contains historical process values at step 1020. The initialization can include an initialization of the unified controller's states and controlled variable predictions. It could also include initialization of the Scheduled To Go Module 910 and the Forecast Update Module 960.

The Scheduled To Go Module 910 keeps track of inventory releases that are made to satisfy a specified schedule at step 1030. The Target Releases Module 920 uses unfilled releases and the number of control intervals remaining in the current period to calculate a target value for the intervals release at step 1040. The Forecast Update Module 960 transforms forecast values from the user perspective to the controller perspective at step 1050. The unified controller 130 then performs its standard calculations at step 1060, such as operations to control a process facility based on the received data. The Priorities Module 940 provides priorities to underlying logistical subsystems and specifies how much of a specific supply stream should be shipped to different locations over a specified control period at step 1070. The Shipping Threshold Module 950 removes a release specifying that material be released from inventory if the quantity calculated by the unified controller 130 is below a specified value at step 1080.

Process systems are affected by changes in their process inputs. Model predictive controllers accommodate inputs such as manipulated variables and disturbance variables. The manipulated variables contain the solution of the controller to be implemented on the process to meet the specified control objectives. The disturbance variables represent external influences on the controlled variables. The effect of the current disturbance variable values on the controlled variable values is contained in the controller algorithm.

Figure 11:
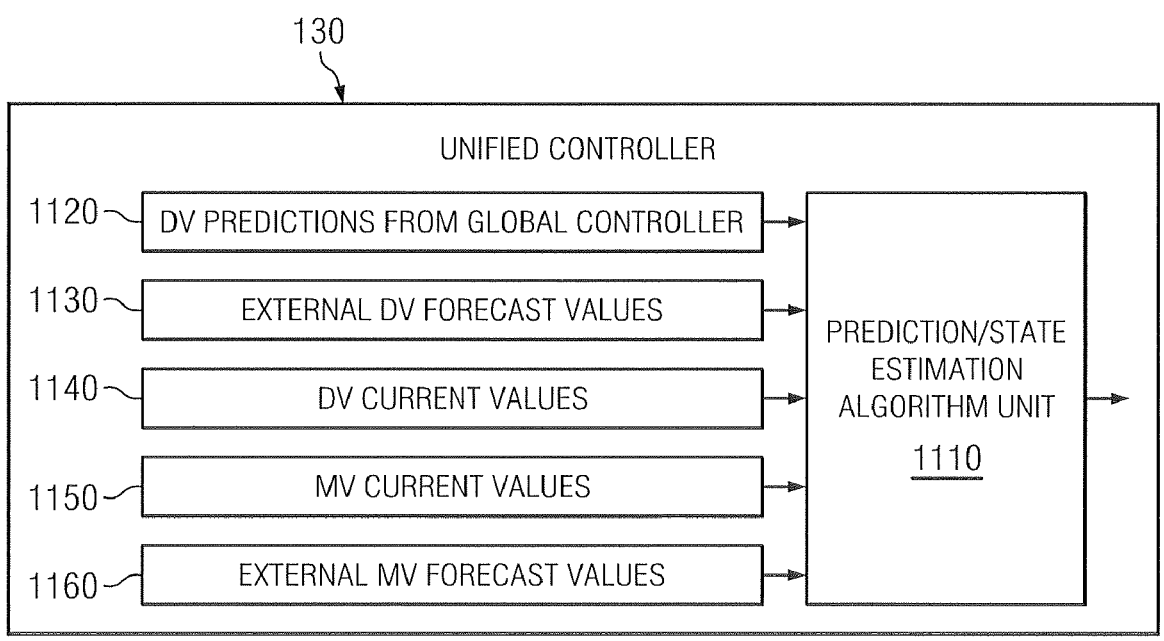
FIG. 11 illustrates example modules in a unified controller for forecasting according to this disclosure.

FIG. 11 illustrates example modules in a unified controller 130 for forecasting according to this disclosure. For a given controller solution, a common assumption is that a disturbance variable maintains its current value into the future. When a manipulated variable is removed from the controller as a decision variable, it becomes, for all intents and purposes, a disturbance variable. The unified controller 130 here includes a prediction/state estimation algorithm unit 1110 that has the ability to receive and use external signals as forecasts of future values of the disturbance variables. FIG. 11 illustrates a schematic representation of the modules within the unified controller 130 that provide forecast values for external disturbance variables and forecast values for external manipulated variables.

As shown in FIG. 11, the prediction/state estimation algorithm unit 1110 can receive:

(1) disturbance variable predictions, such as from the global controller (designated with reference numeral 1120); or (2) external disturbance variable forecast values (designated with reference numeral 1130); and (3) disturbance variable current values (designated with reference numeral 1140); and (4) manipulated variable current values (designated with reference numeral 1150); and (5) external manipulated variable forecast values (designated with reference numeral 1160).

When both (1) and (2) are available, a design engineer or other personnel can determine which should be used.

The external disturbance variable forecast values 1130 provide the predicted (or forecast) future values of the disturbance variables. The external manipulated variable forecast values 1160 provide the predicted (or forecast) future values of the manipulated variables for MVs that are being used as DVs. An MV may be used as a DV when an MV has a solution from an alternative controller or is scheduled manually. These forecasts can improve the ability of the controller to predict the expected disturbances on the controlled variables and thereby improve controller performance.

Figure 12:
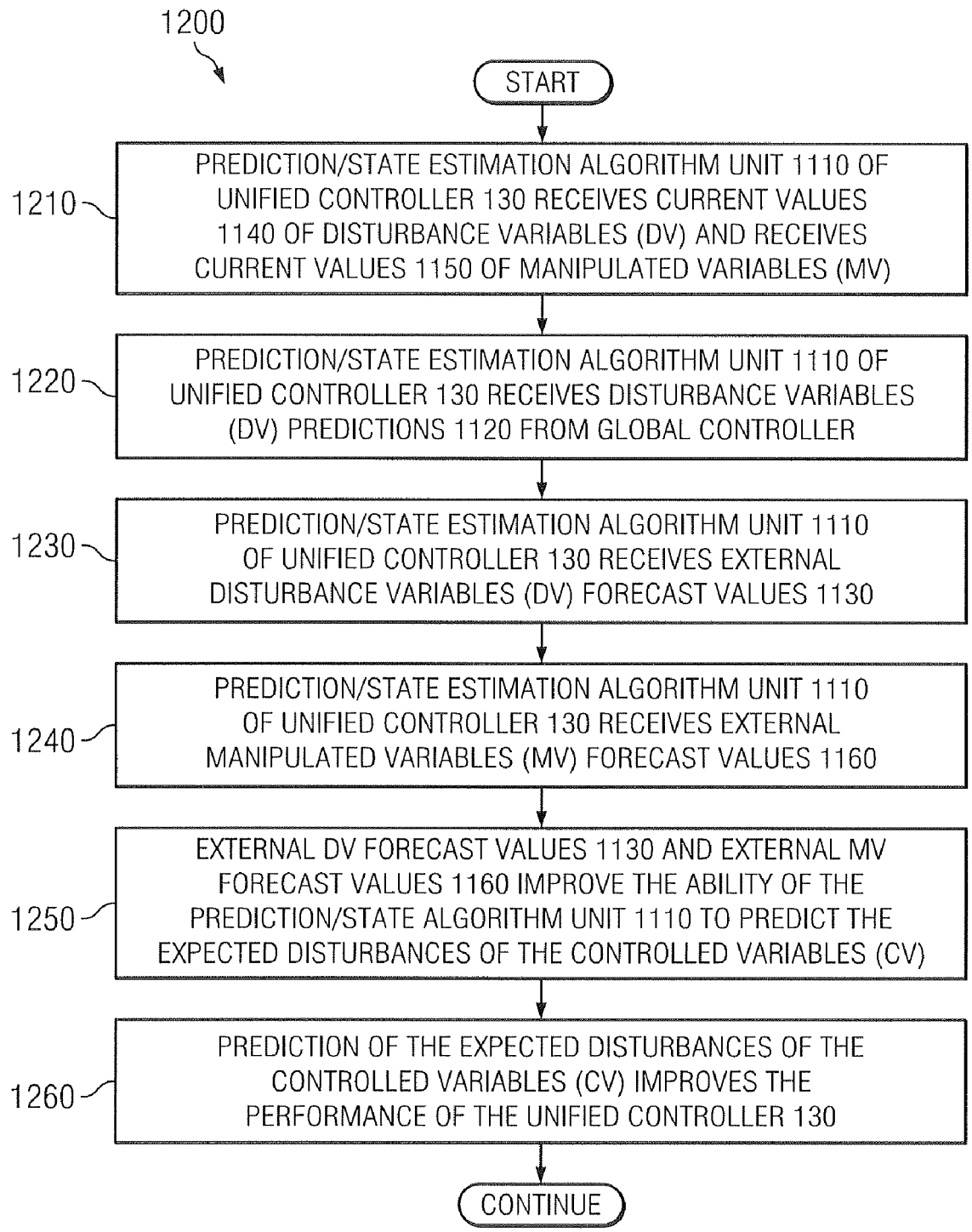
FIG. 12 illustrates an example method for forecasting according to this disclosure.

FIG. 12 illustrates an example method 1200 for forecasting according to this disclosure. Although the steps of the method are listed sequentially, the order of steps 1210 through 1240 is not important. The dynamic prediction/state estimation algorithm unit 1110 of the unified controller 130 receives current values 1140 of disturbance variables and current values 1150 of manipulated variables at step 1210. The prediction/state estimation algorithm unit 1110 receives disturbance variable predictions 1120 from the global controller at step 1220 for DVs that are configured to receive such predictions. The dynamic prediction/state estimation algorithm unit 1110 receives external disturbance variables forecast values 1130 at step 1230. Note that the unified controller 130 may be unable to receive both external DV forecast values 1130 and DV predictions 1120 from the global controller for the same DV. The prediction/state estimation algorithm unit 1110 receives external manipulated variable forecast values 1160 at step 1240 for MVs in feedforward mode that are configured to receive such predictions. MV forecast values 1160 can be ignored if the MV is an active decision variable of the unified controller 130.

The external DV forecast values 1130 and the external MV forecast values 1160 improve the ability of the prediction/state algorithm unit 1110 to predict the expected disturbances of the controlled variables at step 1250. Prediction of the expected disturbances of the controlled variables improves the performance of the unified controller 130 at step 1260.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
a first controller configured to monitor one or more processes associated with a process facility and to generate control data for optimizing the process facility;
a second controller configured to receive the control data and use stochastic calculus of variations calculations to modify at least a portion of the control data, the second controller configured to provide discrete supply chain control and optimization for the process facility and to track at least one of demand requirements and shipping requirements for a product manufactured by a discrete supply chain manufacturing process; and
one or more third controllers configured to operate in accordance with the modified control data to control the one or more processes and to optimize the process facility.

2. The system of claim 1, wherein the second controller comprises:
a first module configured to perform a scheduled to go function to keep track of inventory releases, the inventory releases made to satisfy a specified schedule for the product in the discrete supply chain manufacturing process.

3. The system of claim 2, wherein the first module is configured to use a disturbance variable to represent product orders, a controlled variable to represent unfilled product orders, and at least one manipulated variable to fill the product orders.

4. The system of claim 2, wherein the second controller further comprises:
a second module configured to perform a target release function that uses unfilled releases and a number of control intervals remaining in a current period to calculate a target value for an intervals release.

5. The system of claim 4, wherein the second module is configured to use a manipulated variable to specify the target value, the second module operable to configure one of an optimization target and a control target to meet a target schedule.

6. The system of claim 4, wherein the second module is configured to use a controlled variable to specify the target value, the second module operable to configure one of an optimization target and a control target to meet a target schedule.

7. The system of claim 4, wherein the second controller further comprises:
a third module configured to perform an initialization function that initializes the second controller from a database that contains historical process values.

8. The system of claim 7, wherein the second controller further comprises:
a fourth module configured to perform a shipping priorities function that provides priorities to a logistical subsystem.

9. The system of claim 8, wherein the fourth module is configured to use at least one of: a relative urgency of each shipping destination, inventory predictions, inventory control limits, and demand forecasts to determine relative priorities.

10. The system of claim 8, wherein the second controller further comprises:
a fifth module configured to perform a shipping threshold function that removes a release of the product if a quantity of the product is below a specified value.

11. The system of claim 10, wherein the second controller further comprises:
a sixth module configured to perform a forecast update function that transforms forecast values from a user perspective to a controller perspective.

12. The system of claim 1, wherein the second controller comprises:
a prediction/state estimation algorithm unit;
a first controller module configured to provide external disturbance variable forecast values to the prediction/state estimation algorithm unit; and
a second controller module configured to provide external manipulated variable forecast values to the prediction/state estimation algorithm unit.

13. A method comprising:
monitoring one or more processes associated with a process facility and generating control data for optimizing the process facility;
modifying at least a portion of the control data using stochastic calculus of variations calculations to provide discrete supply chain control and optimization for the process facility and to track at least one of demand requirements and shipping requirements for a product manufactured by a discrete supply chain manufacturing process; and
controlling the one or more processes in accordance with the modified control data to optimize the process facility.

14. The method of claim 13, further comprising:
performing a scheduled to go function to keep track of inventory releases that are made to satisfy a specified schedule for the product in the discrete supply chain manufacturing process.

15. The method of claim 14, wherein the scheduled to go function uses a disturbance variable to represent product orders, a controlled variable to represent unfilled product orders, and at least one manipulated variable to fill the product orders.

16. The method of claim 14, further comprising:
performing a target release function that uses unfilled releases and a number of control intervals remaining in a current period to calculate a target value for an intervals release.

17. The method of claim 16, further comprising:
using one of a manipulated variable and a controlled variable to specify the target value; and
configuring one of an optimization target and a control target to meet a target schedule.

18. The method of claim 16, further comprising:
performing an initialization function that initializes a controller using a database that contains historical process values.

19. The method of claim 18, further comprising:
performing a shipping priorities function that uses at least one of: a relative urgency of each shipping destination, inventory predictions, inventory control limits, and demand forecasts to determine relative priorities for a logistical subsystem.

20. The method of claim 19, further comprising:
performing a shipping threshold function that removes a release of the product if a quantity of the product is below a specified value.

21. An apparatus comprising:
- a first module configured to perform a scheduled to go function to keep track of inventory releases, the inventory releases made to satisfy a specified schedule for a product in a discrete supply chain manufacturing process; and
- a second module configured to perform a target release function that uses unfilled releases and a number of control intervals remaining in a current period to calculate a target value for an intervals release;
- wherein the first module is configured to use a disturbance variable to represent product orders, a controlled variable to represent unfilled product orders, and at least one manipulated variable to fill the product orders; and
- wherein the second module is configured to use one of a manipulated variable and a controlled variable to specify the target value.

22. A non-transitory computer readable medium embodying a computer program, the computer program comprising computer readable program code for:
- receiving control data for optimizing a process facility associated with one or more processes;
- using stochastic calculus of variations calculations to modify at least a portion of the control data to provide discrete supply chain control and optimization for the process facility and to track at least one of demand requirements and shipping requirements for a product manufactured by a discrete supply chain manufacturing process; and
- providing the modified control data to one or more controllers configured to operate in accordance with the modified control data to control the one or more processes.

23. An apparatus comprising:
- at least one processor configured to:
  - receive control data for optimizing a process facility associated with one or more processes;
  - use stochastic calculus of variations calculations to modify at least a portion of the control data to provide discrete supply chain control and optimization for the process facility and to track at least one of demand requirements and shipping requirements for a product manufactured by a discrete supply chain manufacturing process; and
  - provide the modified control data to one or more controllers configured to operate in accordance with the modified control data to control the one or more processes.

24. The system of claim 1, wherein the second controller is configured to:
- predict each of a current time value and a future time value for at least the portion of the control data; and
- identify a predicted slope or trend of the one or more processes with respect to at least the portion of the control data.

* * * * *